US012759516B2

(12) United States Patent
Kim

(10) Patent No.: US 12,759,516 B2
(45) Date of Patent: Oct. 13, 2026

(54) SENSOR MODULE FOR BRAKE SYSTEM

(71) Applicant: HL MANDO CORPORATION, Gyeonggi-do (KR)

(72) Inventor: Hyundong Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 870 days.

(21) Appl. No.: 17/938,940

(22) Filed: Sep. 7, 2022

(65) Prior Publication Data

US 2023/0072126 A1 Mar. 9, 2023

(30) Foreign Application Priority Data

Sep. 7, 2021 (KR) ........................ 10-2021-0118966

(51) Int. Cl.

*B60T 7/04* (2006.01)
*B60T 8/171* (2006.01)
(Continued)

(52) U.S. Cl.

CPC .............. *B60T 7/042* (2013.01); *B60T 8/171* (2013.01); *B60T 11/16* (2013.01); *G01D 5/145* (2013.01);
(Continued)

(58) Field of Classification Search

CPC . B60T 7/042; B60T 7/085; B60T 8/17; B60T 8/171; B60T 11/16; B60T 17/221;
(Continued)

(56) References Cited

U.S. PATENT DOCUMENTS 9,096,203 B2 * 8/2015 Kim ........................ B60T 17/22
11,904,823 B2 * 2/2024 Roos ...................... B60T 17/00
(Continued)

FOREIGN PATENT DOCUMENTS

JP 7-55409 3/1995
JP 6373493 8/2018
(Continued)

OTHER PUBLICATIONS

Machine translation of KR20210048778A (Year: 2021).*
(Continued)

*Primary Examiner* — Judy Nguyen
*Assistant Examiner* — James Split
(74) *Attorney, Agent, or Firm* — WOMBLE BOND DICKINSON (US) LLP

(57) ABSTRACT

Disclosed herein a sensor module for a brake system. In accordance with an aspect of the disclosure, a sensor module for a brake system that measures a moving distance of a movable member interlocking according to a pedal effort of a brake pedal, the sensor module includes a magnet provided on the movable member, a mounting block provided so that the movable member moves forward and backward, the mounting block coupled to a hydraulic block in which a master cylinder is formed to be fixed to a dashboard of a vehicle, and a detecting member provided on the mounting block in order to be spaced apart from the magnet at a predetermined interval, and configured to detect a change in magnetic field according to a movement of the movable member.

16 Claims, 13 Drawing Sheets

(51) Int. Cl.

| | |
|---|---|
| ***B60T 11/16*** | (2006.01) |
| ***G01D 5/14*** | (2006.01) |
| ***G01D 11/24*** | (2006.01) |
| ***G05G 1/38*** | (2008.04) |
| ***G05G 1/46*** | (2008.04) |

(52) U.S. Cl.
CPC ............. *G01D 11/245* (2013.01); *G05G 1/38* (2013.01); *G05G 1/46* (2013.01); *B60T 2220/04* (2013.01); *G01D 5/142* (2013.01)

(58) Field of Classification Search
CPC .... B60T 2220/04; G01D 5/142; G01D 5/145; G01D 11/245; G05G 1/38; G05G 1/46
See application file for complete search history.

(56) References Cited

U.S. PATENT DOCUMENTS

| | | | | |
|---|---|---|---|---|
| 2009/0278641 | A1* | 11/2009 | Hedayat | F15B 15/2861 335/284 |
| 2024/0182014 | A1* | 6/2024 | Zhang | B60T 11/16 |

FOREIGN PATENT DOCUMENTS

| | | | |
|---|---|---|---|
| KR | 10-2011-0053777 | 5/2011 | |
| KR | 10-2021-0048778 | 5/2021 | |
| WO | WO-2023070628 A1 * | 5/2023 | F16D 66/00 |

OTHER PUBLICATIONS

Office Action (1st) dated Jul. 31, 2025 for Korean Patent Application No. 10-2021-0118966 and its English translation provided by Applicant's foreign counsel.

* cited by examiner

【FIG. 1】
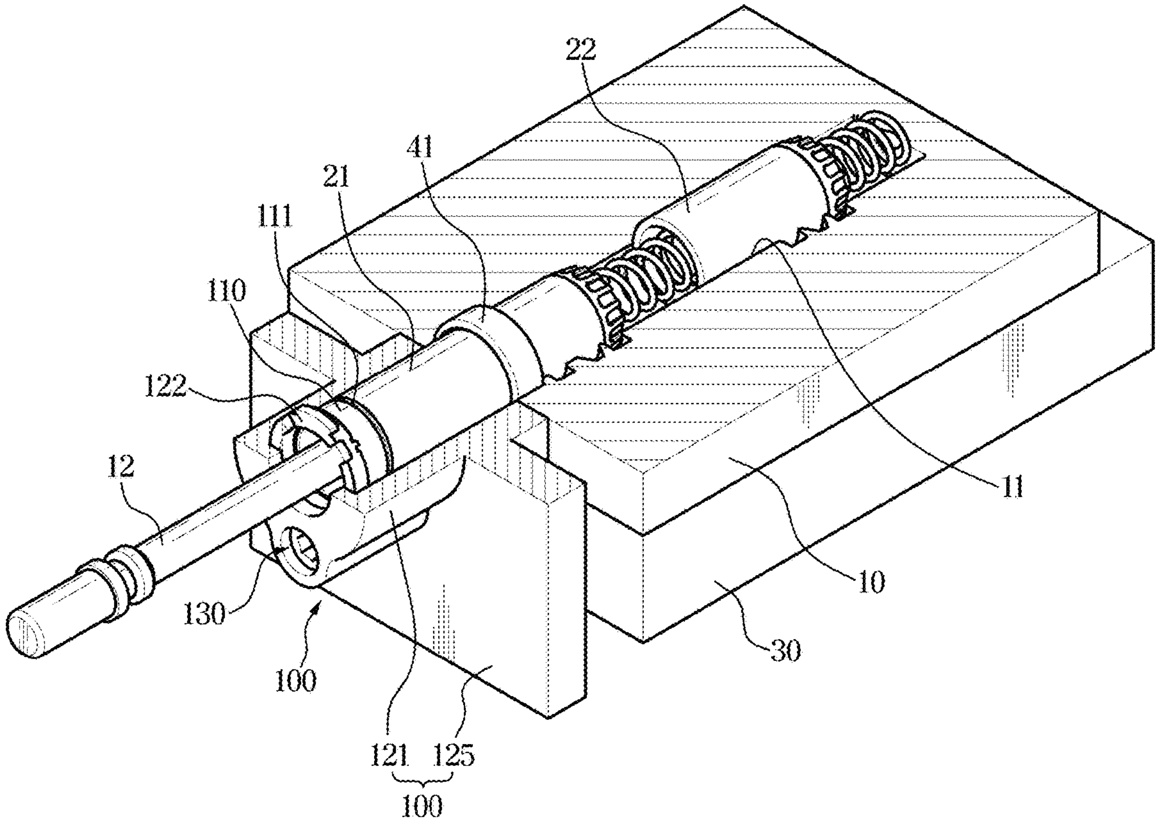

【FIG. 2】
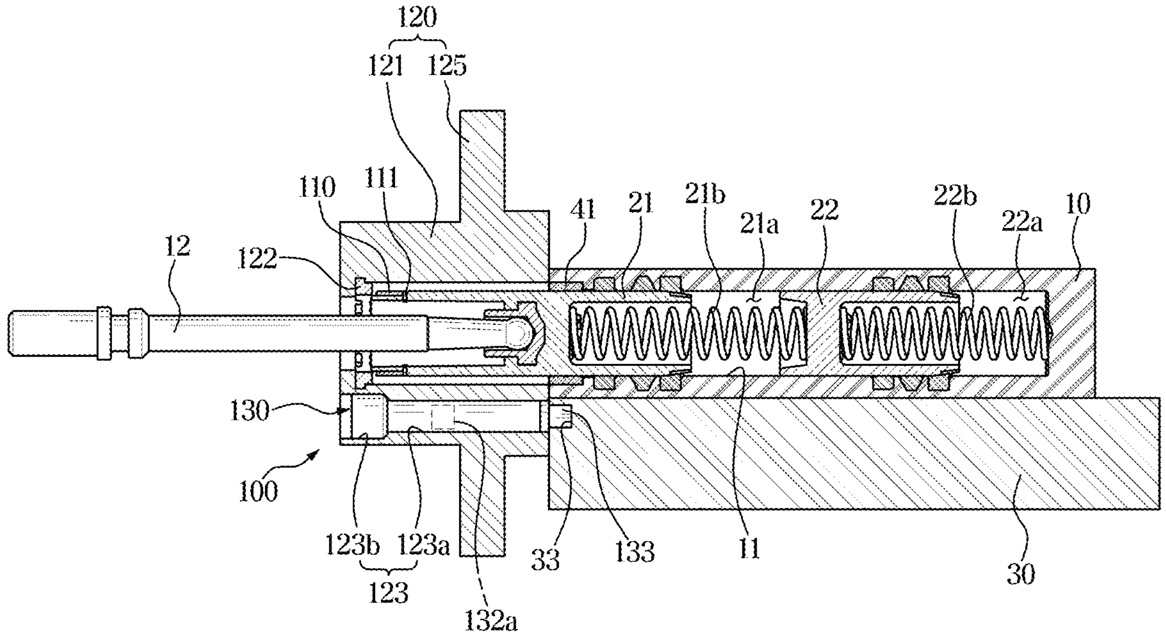

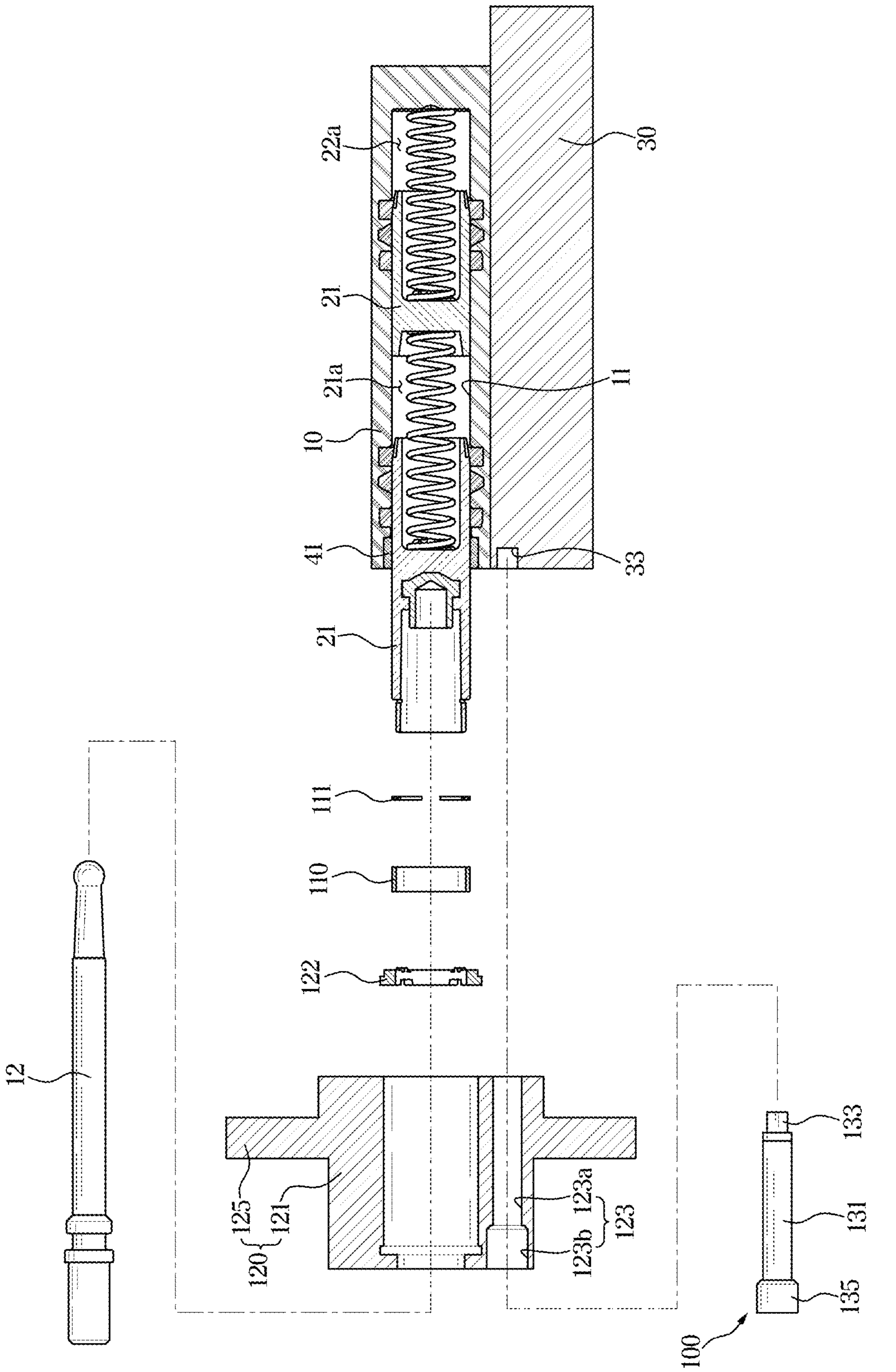
【FIG. 3】

【FIG. 4】
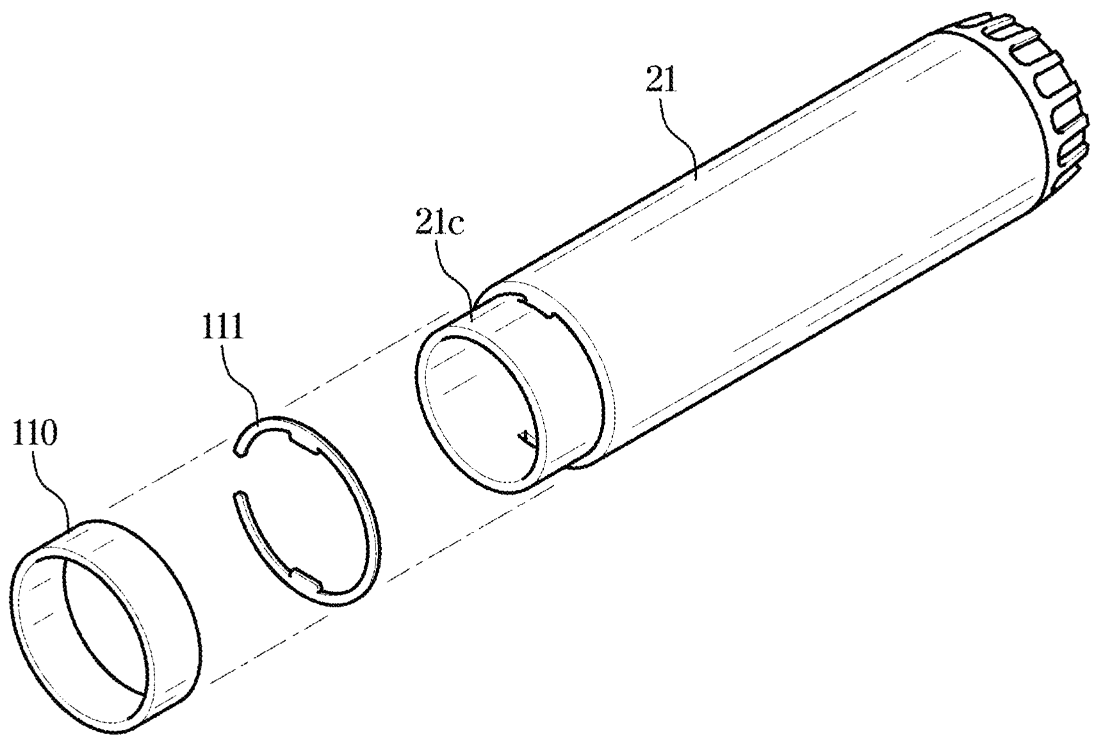

【FIG. 5】
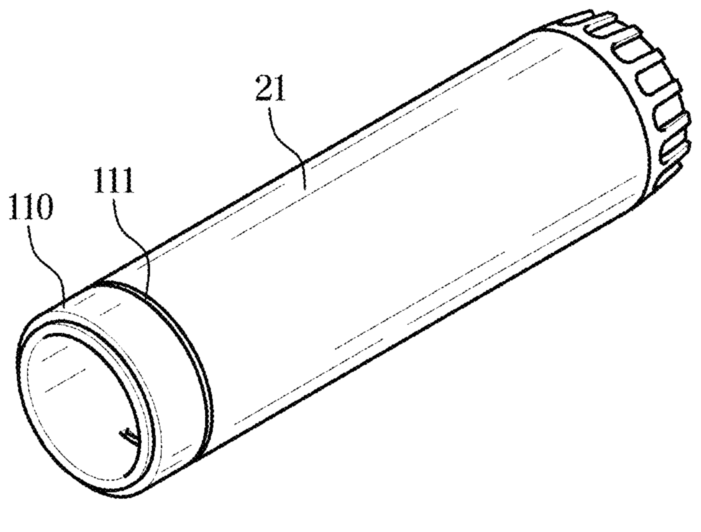

【FIG. 6】
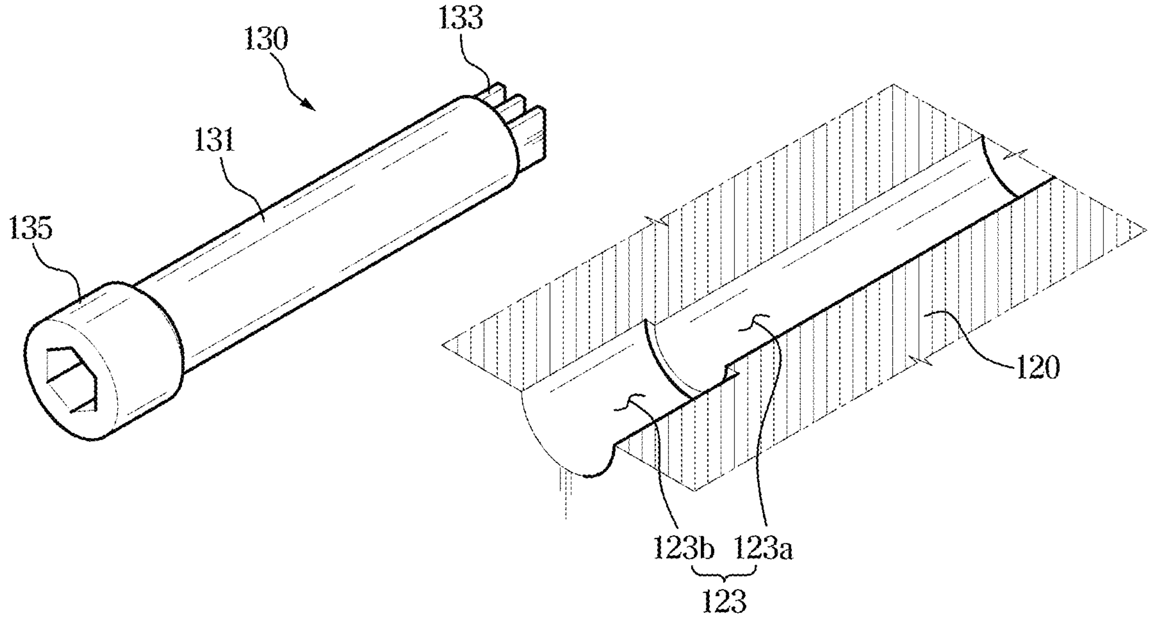

【FIG. 7】
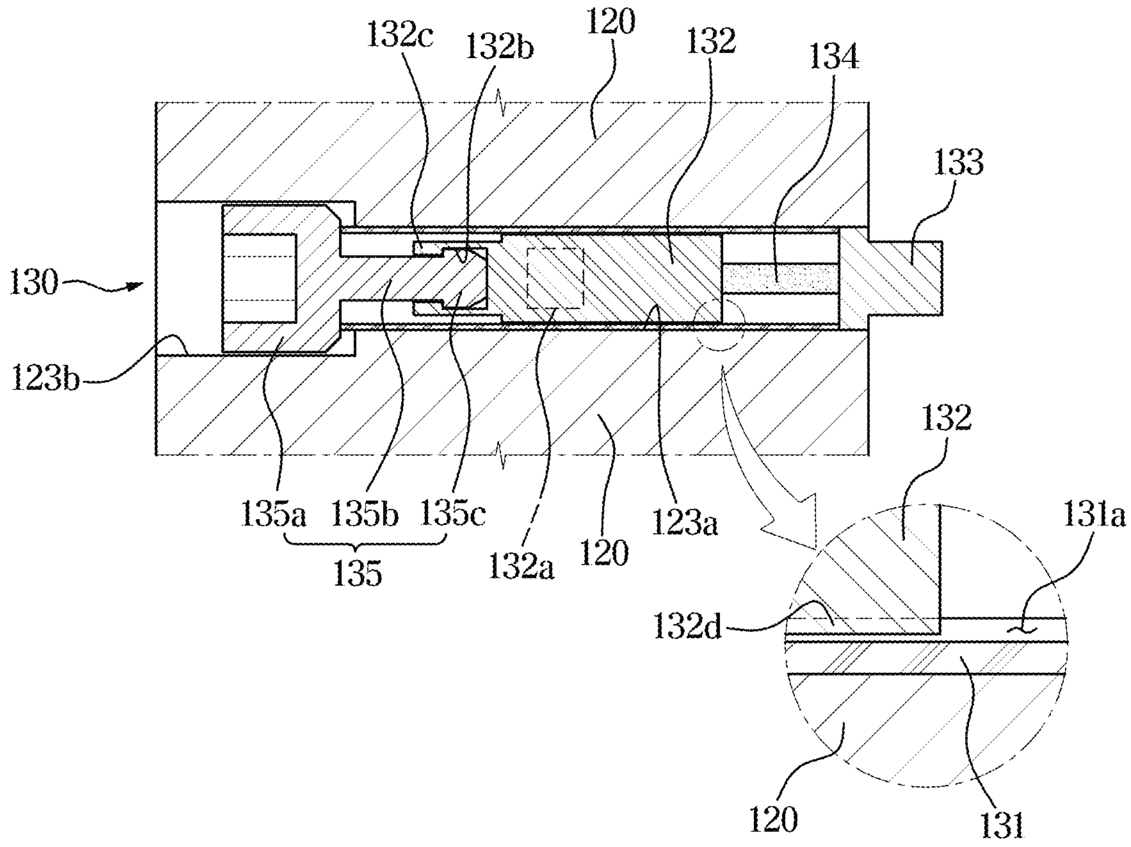

【FIG. 8】
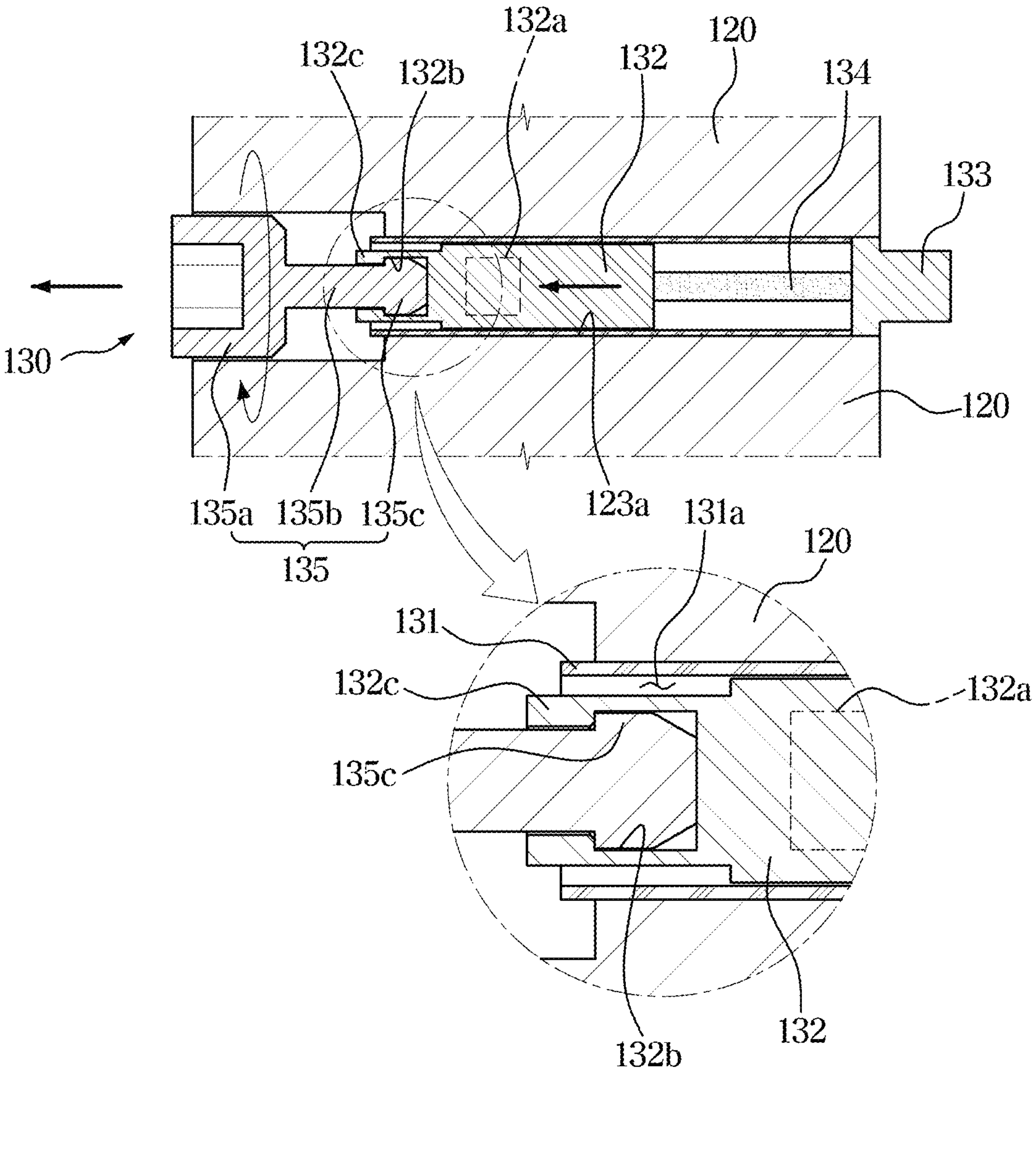

【FIG. 9A】
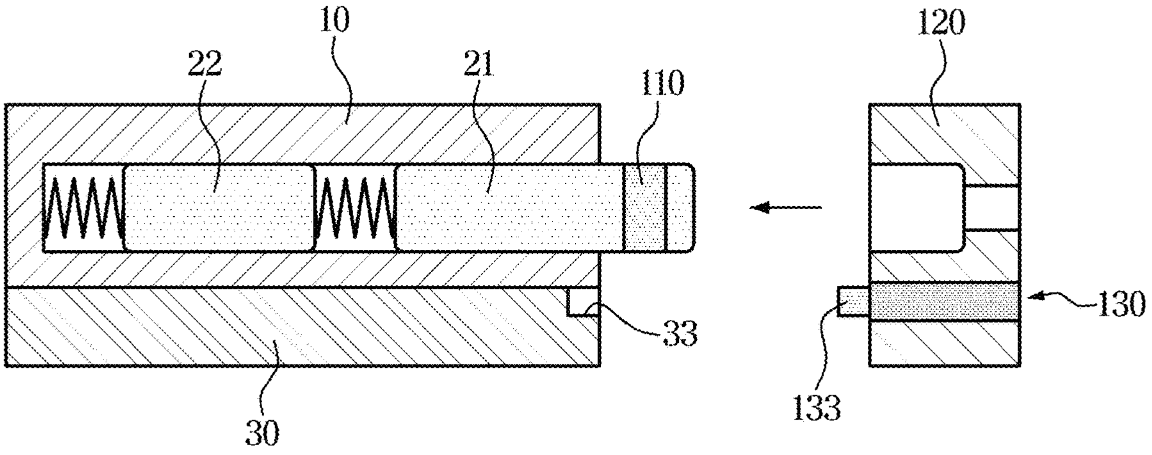

【FIG. 9B】
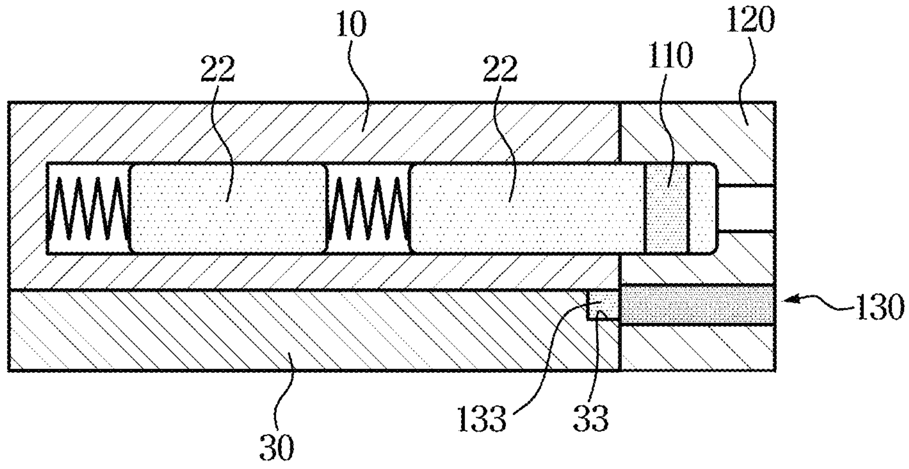

【FIG. 10A】
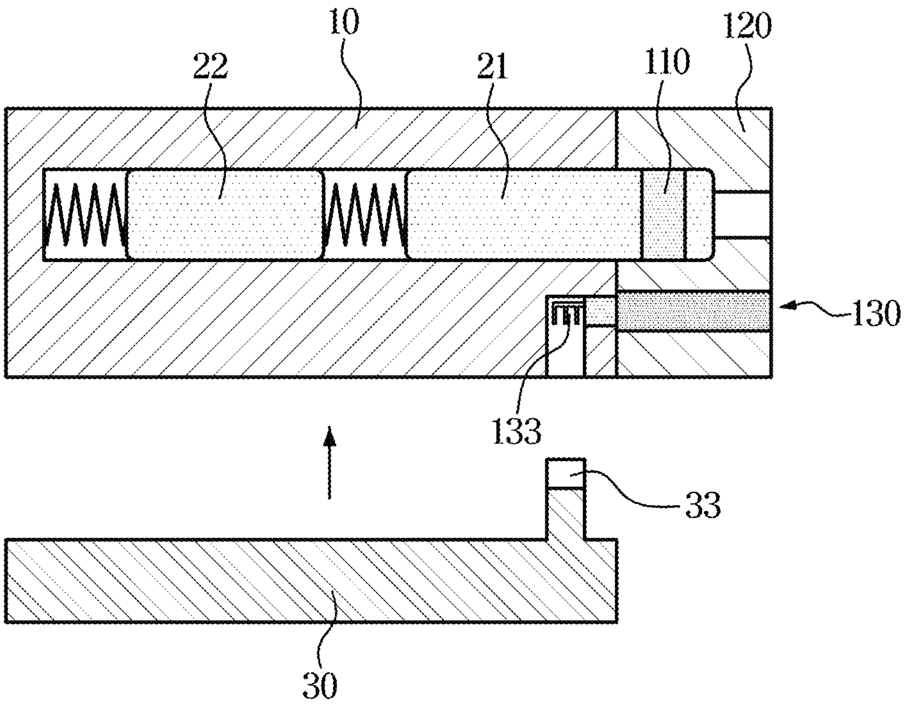

【FIG. 10B】
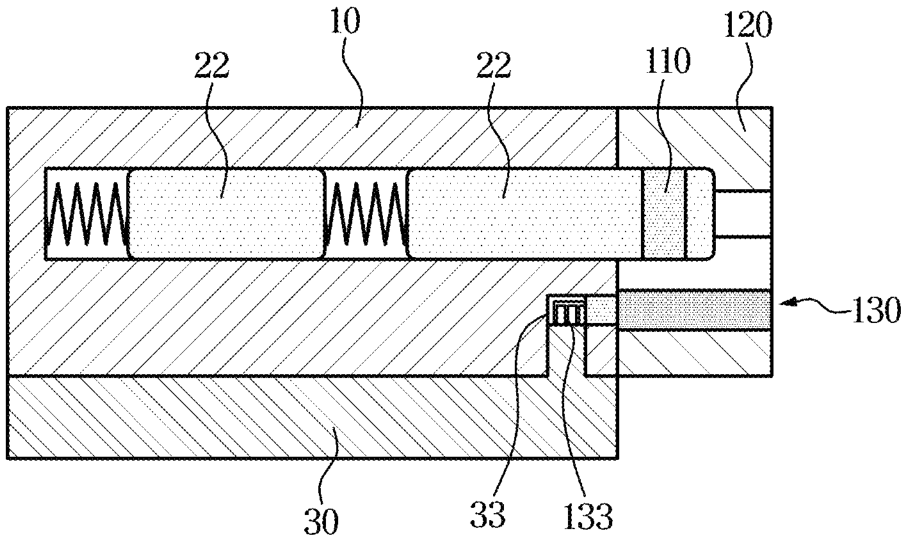

【FIG. 11】
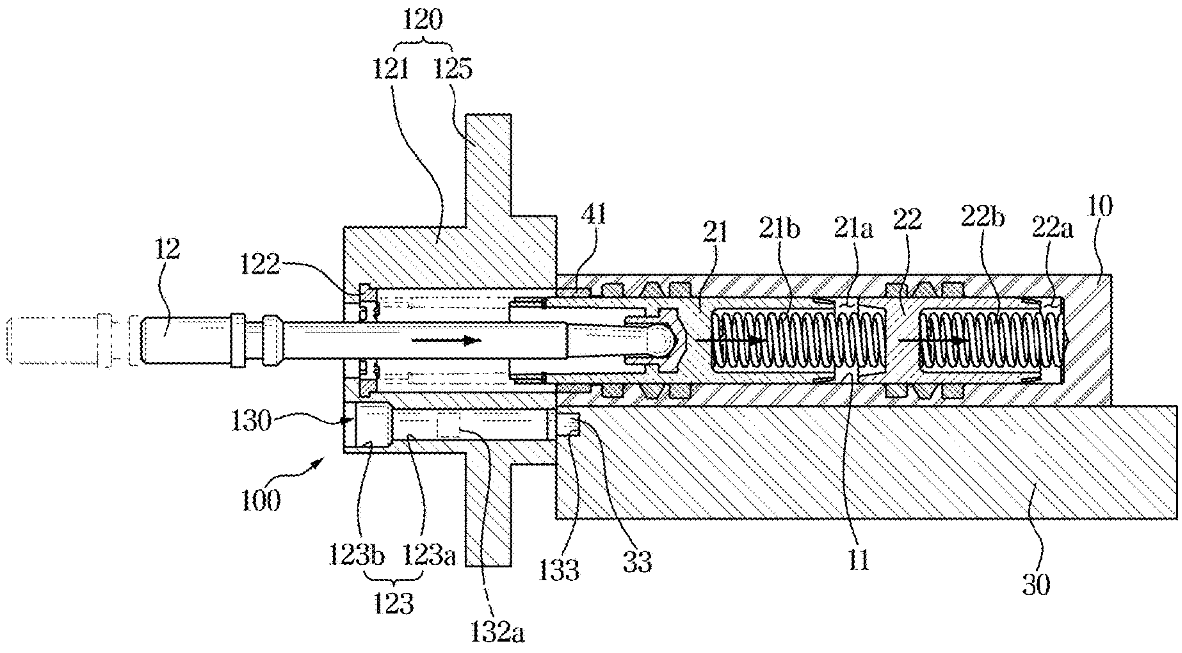

SENSOR MODULE FOR BRAKE SYSTEM

CROSS-REFERENCE TO RELATED APPLICATION(S)

This application is based on and claims priority under 35 U.S.C. § 119 to Korean Patent Application No. 10-2021-0118966, filed on Sep. 7, 2021 in the Korean Intellectual Property Office, the disclosure of which is incorporated herein by reference in its entirety.

TECHNICAL FIELD

The present disclosure relates to a sensor module for a brake system, and more particularly, to a sensor module for a brake system capable of simplifying a structure of a sensor for detecting a displacement of a brake pedal and ensuring ease of assembly.

BACKGROUND

In general, vehicles are provided with a mechanism that detects a pivot angle of pedal arms, such as a brake pedal and an accelerator pedal at all times, and enables precise control based on the detected data.

For example, a conventional mechanism detects how much pedal arms of a brake pedal is pivoted with a pedal stroke sensor, resulting in controlling devices electrically. A pedal stroke sensor disclosed in Korean Patent Application Laid-Open No. 10-2011-0053777 is a type that detects an angle of a brake pedal, and is provided near a hinge shaft installed so that a pedal arm may be pivoted. In addition, the pedal stroke sensor measures a degree of progress of the brake pedal through a change in an output value according to a pivot angle of the brake pedal.

However, since such an angle type of the pedal stroke sensor is installed on the brake pedal spaced apart from a brake module, the pedal stroke sensor is calibrated for offset correction in a state where assembly is completed, thereby deteriorating calibration correction and quality.

Furthermore, because a pivot angle is detected by a contact method, a structure thereof is complicated, and reliability of accurate detection is deteriorated due to generation of friction noise and change in durability.

On the other hand, as a means for detecting a displacement of a brake pedal to solve the above disadvantages, a type for measuring a displacement of a piston of a master cylinder interlocking with a brake pedal is used.

For example, pedal stroke sensors applied in a brake system attach a magnet to the inside of a piston or mounts a bracket to which a magnet is attached to the outside thereof, and accordingly, detect a change in magnetic field of the magnet that moves together when the piston or the bracket moves to measure a degree of progress of the brake pedal.

However, because the pedal stroke sensor applied in such a brake system have a complicated structure, and performance thereof may be confirmed in a state of the finished product in which the pedal stroke sensor is installed, repair and replacement costs increase when a performance error occurs, as well as outsourcing is unavailable.

SUMMARY

An aspect of the present disclosure is to provide a sensor module for a brake system capable of simplifying a structure, and assembling easily using a product whose performance has been verified so that outsourcing is available.

Further, an aspect of the present disclosure is to provide a sensor module for a brake system capable of securing ease of assembly by allowing an assembly sequence to be installed in a brake system to be freely set.

Further, an aspect of the present disclosure is to provide a sensor module for a brake system capable of improving reliability of a product by adjusting a position of a sensing unit if an error occurs when installing a movable member and the sensing unit to measure a displacement.

Additional aspects of the disclosure will be set forth in part in the description which follows and, in part, will be obvious from the description, or may be learned by practice of the disclosure.

In accordance with an aspect of the disclosure, a sensor module for a brake system that measures a moving distance of a movable member interlocking according to a pedal effort of a brake pedal includes a magnet provided on the movable member, a mounting block provided so that the movable member moves forward and backward, the mounting block coupled to a hydraulic block in which a master cylinder is formed to be fixed to a dashboard of a vehicle, and a detecting member provided on the mounting block in order to be spaced apart from the magnet at a predetermined interval, and configured to detect a change in magnetic field according to a movement of the movable member.

The detecting member may be provided integrally with the mounting block, or provided to be detachably assembled.

The detecting member may be electrically and mechanically connected to an electronic control unit (ECU) mounted on the hydraulic block through the mounting block.

The electronic control unit and the detecting member may be electrically and mechanically connected even if the mounting block is assembled thereto in a state in which the electronic control unit is coupled to the hydraulic block, or even if the electronic control unit is assembled to the hydraulic block after assembling the mounting block to the hydraulic block.

The detecting member may have a predetermined length, and is disposed in a sensor mounting hole formed in the mounting block to have a direction parallel to a moving direction of the movable member, and the detecting member may be provided to be variable in a position thereof in the longitudinal direction of the sensor mounting hole.

The detecting member may further include a sensor housing provided slidably in the sensor mounting hole and provided with a sensing unit for detecting a change in magnetic field, a connection port coupled to the electronic control unit, a cap bolt coupled to move together with the sensor housing and screw-coupled into the sensor mounting hole, and a cable connecting the sensing unit and the connection port.

The sensor module may further include a main housing configured to accommodate slidably the sensor housing, be inserted and coupled to the sensor mounting hole, and be hollow so that opposite sides thereof are opened in the longitudinal direction.

The cap bolt coupled to the sensor housing may be provided on one open side of the main housing, and the connection port is coupled to the other open side of the main housing.

A guide groove may be formed in the main housing in a moving direction of the sensor housing, and a guide protrusion may be provided in the sensor housing to be inserted into the guide groove and guided when moving.

The cable may have a predetermined length to maintain a connection between the sensing unit and the connection port even if a position of the sensor housing changes.

The cap bolt may further include a head part screw-coupled to the sensor mounting hole, and a coupling part extending from the head part and coupled to the sensor housing.

The sensor housing may be provided with a coupling groove coupled to the coupling part, the coupling groove is provided with an anti-separation step formed to have a diameter smaller than that of the coupling groove, and an anti-separation protrusion corresponding to the diameter of the coupling groove is provided on the coupling part to prevent the coupling part from being separated from the coupling groove.

The sensor mounting hole may be divided into a first mounting hole to which the main housing is coupled and a second mounting hole to which the cap bolt is coupled, and the second mounting hole may have a length longer than that of the head pat of the cap bolt.

The movable member may be provided with a push rod connected to the brake pedal, and a piston pressed by the push rod, the magnet may be provided on the push rod or the piston.

The movable member may be provided as a piston that moves forward and backward in a bore formed in the hydraulic block, and further include a clip made of a steel material and fixed to an outer circumferential surface of the piston, and the magnet may be attached to the clip by a magnetic force to be fixed to the piston.

A stepped portion may be provided on the outer circumferential surface of the piston so that the clip and the magnet are disposed, and the clip and the magnet may be provided on the stepped portion so as not to protrude from an outer diameter of the piston.

A portion of the piston may be provided to protrude from the hydraulic block, the mounting block may further include a guide portion coupled to the hydraulic block to surround the piston protruding from the hydraulic block and having a through hole formed therein so that the push rod for pressing the piston is inserted, and a mounting portion extending in a radial direction from one side of an outer circumferential surface of the guide portion and fixed to the dashboard of the vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a partially cut-away perspective view illustrating a state in which a sensor module for a brake system according to an exemplary embodiment of the present disclosure is provided in a hydraulic block;

FIG. 2 is a partial cross-sectional view illustrating a hydraulic block of a brake system provided with the sensor module according to an exemplary embodiment of the present disclosure;

FIG. 3 is an exploded view illustrating a cross section of FIG. 2;

FIG. 4 is an exploded perspective view illustrating a state in which a magnet of the sensor module for the brake system according to an exemplary embodiment of the present disclosure is coupled to a piston;

FIG. 5 is an assembled perspective view of FIG. 4;

FIG. 6 is a view illustrating a state in which a detecting member is coupled to a mounting block provided in the sensor module for the brake system according to an exemplary embodiment of the present disclosure;

FIG. 7 is a cross-sectional view illustrating the detecting member provided in the sensor module for the brake system according to an exemplary embodiment of the present disclosure;

FIG. 8 is a view illustrating a state in which a position of the detecting member provided in the sensor module for the brake system according to an exemplary embodiment of the present disclosure is changed;

FIG. 9A is a view illustrating a state in which the mounting block of the sensor module for the brake system according to an exemplary embodiment of the present disclosure is assembled to a hydraulic block to which an electronic control unit is coupled;

FIG. 9B is a view illustrating a state in which the mounting block of the sensor module for the brake system according to an exemplary embodiment of the present disclosure is assembled to a hydraulic block to which an electronic control unit is coupled;

FIG. 10A is a view illustrating a state in which the electronic control unit is assembled to the hydraulic block in a state in which the mounting block of the sensor module for the brake system according to an exemplary embodiment of the present disclosure is assembled to the hydraulic block;

FIG. 10B is a view illustrating a state in which the electronic control unit is assembled to the hydraulic block in a state in which the mounting block of the sensor module for the brake system according to an exemplary embodiment of the present disclosure is assembled to the hydraulic block; and FIG. 11 is a view illustrating an operating state of the sensor module for the brake system according to an exemplary embodiment of the present disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a partially cut-away perspective view illustrating a state in which a sensor module for a brake system according to an exemplary embodiment of the present disclosure is provided in a hydraulic block, FIG. 2 is a partial cross-sectional view illustrating a hydraulic block of a brake system provided with the sensor module according to an exemplary embodiment of the present disclosure, and FIG. 3 is an exploded view illustrating a cross section of FIG. 2.

Referring to FIGS. 1 to 3, a sensor module 100 for a brake system according to an exemplary embodiment of the present disclosure may include a magnet 110 provided in a movable member that interlocks according to a pedal effort of a brake pedal (not shown), a mounting block 120 fixed to a dashboard (not shown) of a vehicle, and a detecting member 130 that is provided on the mounting block 120 and detects a change in magnetic field according to a movement of the magnet 110 moving together with the movable member.

Herein, the movable member on which the magnet 110 is installed may be a push rod 12 connected to the brake pedal or pistons 21 and 22 pressed by the push rod 12. In other words, the magnet 110 may be provided on the push rod 12 or the pistons 21 and 22 to move forward and backward according to a pressure of the brake pedal. A structure in which the magnet 110 is installed on the movable member will be described again below.

On the other hand, according to an exemplary embodiment, the sensor module 100 may be provided in a separate master cylinder, but preferably may be provided in a hydraulic block 10 provided with the master cylinder. In other words, the hydraulic block 10 is provided with a plurality of flow paths, valves and the master cylinders for controlling a braking hydraulic pressure therein. Furthermore, an electronic control unit 30 for controlling the valves and various electronic components may be coupled to the hydraulic block 10.

The hydraulic block 10 has a hexahedral shape and serves to transmit a braking hydraulic pressure to a wheel cylinder (not shown) provided on each wheel. Accordingly, the flow paths are formed in the hydraulic block 10 to control the brake hydraulic pressure transmitted to the wheel cylinders, and the plurality of valves are installed in place. Furthermore, the master cylinder is provided inside the hydraulic block 10. The master cylinder includes at least one chamber and at least one piston that is connected to the brake pedal and is pressed according to a pressing force of the brake pedal and, thereby generating a hydraulic pressure. In other words, the master cylinder is configured to generate the hydraulic pressure by pressing the piston according to operation of an operating unit composed of a clevis (not shown) coupled to the brake pedal and a push rod 12 coupled to the clevis.

Furthermore, although not shown in drawings, a reservoir for storing oil is coupled to an upper portion of the hydraulic block 10 in which the master cylinder is configured to provide the hydraulic pressure to the master cylinder.

To form the master cylinder in the hydraulic block 10 as described above, a bore 11 having one side open is formed in the hydraulic block 10. Here, when the hydraulic block 10 is provided as the master cylinder, the hydraulic block 10 may be understood to mean a cylinder body. The hydraulic block 10 may be coupled to the mounting block 120 to be described later and mounted on a vehicle.

At least one piston 21 and 22 operated by operation of the push rod 12 coupled to the brake pedal (not shown) is provided in the bore 11 to move forward and backward. As shown in drawings, the pistons 21 and 22 may be provided as a first piston 21 and a second piston 22 and arranged in series in the bore 11.

In the bore 11, a first hydraulic chamber 21*a* which is a space in which hydraulic pressure is formed between the first piston 21 and the second piston 22 is formed, and a second hydraulic chamber 22*a* that is a space where the hydraulic pressure is formed between the second piston 22 and an inner wall of the other side of the bore 11 is formed. A first return spring 21*b* for restoring the first piston 21 is provided in the first hydraulic chamber 21*a*, and a second return spring 22*b* for restoring the second piston 22 is provided in the second hydraulic chamber 22*a*.

On the other hand, a portion of the first piston 21 is provided to protrude from the hydraulic block 10 through the open bore 11.

In the hydraulic block 10 for the brake system having the above structure, the sensor module 100 including the magnet 110, the mounting block 120 and the detecting member 130 may be installed in order to detect a displacement according to the pedal effort of the brake pedal.

The magnet 110 may be provided on the pistons 21 and 22 or the push rod 12, which are the movable members. For example, as shown in FIGS. 4 and 5, the magnet 110 may be provided on the first piston 21. Referring to the drawings, the magnet 110 may be coupled to the first piston 21 through a clip 111 fixed to an outer surface of the first piston 21. More specifically, a stepped portion 21*c* may be provided on an outer circumferential surface of the first piston 21 so that the clip 111 and the magnet 110 are installed thereon. Furthermore, the clip 111 may be made of a steel material. Accordingly, the clip 111 is fixed to the outer circumferential surface of the first piston 21, and the magnet 110 may be attached to the metal clip 111 by magnetic force, thereby fixing to the first piston 21.

On the other hand, since the first piston 21 moves forward and backward into the bore 11, the clip 111 and the magnet 110 provided in the stepped portion 21*c* are preferable provided not to protrude from the outer diameter of the first piston 21.

As described above, because it is possible to easily couple the magnet 110 to the first piston 21 through the clip 111, as well as to make it detachable thereof, so that the disclosure has advantage of replace and repair in the future easily. In addition, although not shown in the drawings, a stopper for preventing separation of the magnet 110 may be further installed on the rear side (a direction in which the first piston moves toward the push rod) of the first piston 21. Herein, the magnet 110 provided in the first piston 21 is shown to be positioned in a portion exposed from the bore 11 of the hydraulic block 10, but the disclosure is not limited thereto. For example, the magnet 110 provided in the first piston 21 may be provided to be positioned within the bore 11 as long as it may be installed to face the detecting member 130 to be described later while being spaced apart from each other by a predetermined interval.

On the other hand, when the magnet 110 may be provided on the push rod 12, the magnet 110 is provided integrally with an outer circumferential surface of the push rod 12 by insert injection or the like, or is separately coupled to move together according to the pedal effort of the brake pedal.

Referring back to FIGS. 1 to 3, the mounting block 120 is coupled to the dashboard (not shown) of the vehicle, and is coupled to the hydraulic block 10 to support the hydraulic block 10. The mounting block 120 may include a guide portion 121 coupled to the hydraulic block 10 and provided to surround the first piston 21 protruding from the hydraulic block 10, and a mounting portion 125 extending in a radial direction from one side of an outer circumferential surface of the guide portion 121.

The guide portion 121 and the mounting portion 125 are provided integrally, and may be fixed to the dashboard of the vehicle by bolting or the like through the mounting portion 125. In this case, the guide portion 121 and the mounting portion 125 may be provided as separate parts and coupled thereto.

A through hole 121*a* is formed in the guide portion 121 so that the push rod 12 for pressing the first piston 21 is inserted to be connected to the first piston 21. In addition, the push rod 12 and a portion of the first piston 21 are provided in the guide portion 121 to be insertable. Meanwhile, although not shown in the drawings, a boot for preventing foreign substances such as dust from entering the bore 11 through the through hole 121*a* is installed at an end of the guide portion 121. The boot has one end installed at the end of the guide portion 121 and the other end installed on the push rod 12, so that it may be compressed and extendable according to the operation of the push rod 12.

A sensor mounting hole 123 may be formed in the mounting block 120. The sensor mounting hole 123 is a portion to which the detecting member 130 is coupled, and may be formed so that the detecting member 130 may pass through the guide portion 121 to be electromechanically coupled to the electronic control unit 30. A structure in which the detecting member 130 is coupled through the sensor mounting hole 123 will be described again below.

On the other hand, a step portion 121*b* for preventing the first piston 21 from being separated from the hydraulic block 10 through the bore 11 is formed at the other end of the mounting block 120, that is, the guide portion 121 in the direction in which the first piston 21 is returned. The step portion 121*b* may be formed to be stepped from the through hole 121*a* to face the end of the first piston 21.

Furthermore, the mounting block 120 may be provided with a buffer member 122 coupled and supported by the step portion 121*b*. The buffer member 122 is provided between the step portion 121*b* of the guide portion 121 and the first piston 21 to prevent the first piston 21 from directly contacting the step portion 121*b* when the first piston 21 returns, thereby performing a serve to buffer the impact.

On the other hand, an undescribed reference numeral 41 is a guide bush installed in the hydraulic block 10 to guide a straight movement of the first piston 21 when the first piston 21 moves according to the pedal effort of the brake pedal.

The detecting member 130 may be provided on the mounting block 120 as described above. The detecting member 130 may be provided to be integrally formed when the mounting block 120 is manufactured, but also may be separately assembled to the mounting block 120. The detecting member 130 may be provided to vary a position of a sensing unit 132*a* so as to not only serve to detect a change in magnetic field of the magnet 110 moving together when the movable member is moved, but also smoothly perform a function according to an assembly error.

FIG. 6 is a view illustrating a state in which a detecting member is coupled to a mounting block provided in the sensor module for the brake system according to an exemplary embodiment of the present disclosure, FIG. 7 is a cross-sectional view illustrating the detecting member provided in the sensor module for the brake system according to an exemplary embodiment of the present disclosure, and FIG. 8 is a view illustrating a state in which a position of the detecting member provided in the sensor module for the brake system according to an exemplary embodiment of the present disclosure is changed.

Referring to FIGS. 6 to 8, the detecting member 130 has a predetermined length and may be coupled to the sensor mounting hole 123 formed in the mounting block 120, and is positioned in the longitudinal direction of the sensor mounting hole 123. It may be provided to be variable. At this time, as the sensor mounting hole 123 is provided to have a direction parallel to the moving direction of the movable member, the detecting member 130 may be provided to be parallel to the moving direction of the movable member.

More specifically, the detecting member 130 may include a main housing 131 hollow so that opposite sides thereof are opened in a longitudinal direction, a sensor housing 132 having the sensing unit 132*a* that is provided to be slidable in the main housing 131 and detects a change in magnetic field, a connection port 133 coupled to the electronic control unit 30, a cap bolt 135 coupled to move together with the sensor housing 132, and a cable 134 connecting the connection port 133 with the sensing unit 132*a*.

The main housing 131 is inserted and coupled to the sensor mounting hole 123, and may be provided to have a predetermined length to accommodate the sensor housing 132 and the cable 134 therein. The cap bolt 135 coupled to the sensor housing 132 may be provided on one open side of the main housing 131, and the connection port 133 may be coupled to the other open side thereof. The main housing 131 may be inserted and fixed to the sensor mounting hole 123.

On the other hand, a guide groove 131*a* may be formed in the main housing 131 in the longitudinal direction. The guide groove 131*a* serves to guide the sensor housing 132 to be stably moved when the sensor housing 132 is moved through a guide protrusion 132*d* formed on the sensor housing 132 to be described later.

The cap bolt 135 may include a head part 135*a* screw-coupled to the sensor mounting hole 123 and a coupling part 135*b* extending from the head part 135*a* to be coupled to the sensor housing 132.

A male thread (not shown) is formed on the outer circumferential surface of the head part 135*a*, and a female thread (not shown) is formed on the inner circumferential surface of the sensor mounting hole 123 to which the head part 135*a* is coupled, so that the head part 135*a* may be screw-coupled into the sensor mounting hole 123. As a result, the cap bolt 135 may move in the longitudinal direction of the sensor mounting hole 123 according to a rotational direction of the head part 135*a*.

Meanwhile, the sensor mounting hole 123 may be divided into a portion to which the main housing 131 is coupled and a portion to which the cap bolt 135 is coupled. In other words, the sensor mounting hole 123 may include a first mounting hole 123*a* to which the main housing 131 is coupled and a second mounting hole 123*b* to which the cap bolt 135 is coupled. Each of the mounting holes 123*a* and 123*b* may be formed to have a shape corresponding to the appearance of the parts to be coupled.

Furthermore, the second mounting hole 123*b* is provided to have a length longer than that of the head part 135*a* of the cap bolt 135 to secure an extra moving distance according to the moving direction when moving due to the rotation of the cap bolt 135.

The coupling part 135*b* may be provided to be coupled to the sensor housing 132 and move together with the sensor housing 132 according to the movement of the cap bolt 135. The coupling structure of the coupling part 135*b* and the sensor housing 132 will be described again below.

The sensor housing 132 is slidably provided in the sensor mounting hole 123, that is, the main housing 131, and includes the sensing unit 132*a* capable of sensing magnetic field of the magnet 110. The sensing unit 132*a* may be provided as a Hall sensor (a magnetic detection element) that detects a magnetic force intensity that is changed when the magnet 110 moves.

Furthermore, the sensor housing 132 may include a coupling groove 132*b* coupled to the coupling part 135*b*. The coupling groove 132*b* may be provided with an anti-separation step 132*c* formed to have a diameter smaller than that of the coupling groove 132*b*. The coupling portion 135*b* coupled to the coupling groove 132*b* may be provided with anti-separation protrusion 135*c* corresponding to the diameter of the coupling groove 132*b* so as to prevent separation from the coupling groove 132*b*. Accordingly, when the cap bolt 135 moves in a direction away from the sensor mounting hole 123, the anti-separation protrusion 135*c* is supported by the anti-separation step 132*c*, such that the sensor housing 132 moves together. In other words, as the coupling groove 132*b* of the sensor housing 132 is coupled to surround the coupling portion 135*b* of the cap bolt 135, the sensor housing 132 moves together with the cap bolt 135 when moving due to the rotation of the cap bolt 135.

Meanwhile, the guide protrusion 132*d* inserted into the guide groove 131*a* formed in the main housing 131 may be formed on the outer surface of the sensor housing 132. At this time, although the guide groove 131*a* is formed in the main housing 131 and the guide protrusion 132*d* is formed in the sensor housing 132, the disclosure is not limited thereto, and the guide protrusion may be formed in the main housing 131 and the guide groove may be formed in the sensor housing 132.

The connection port 133 is a part electrically and mechanically connected to a connector portion 33 of the electronic control unit 30, and may be coupled to the electronic control unit 30 through the mounting block 120. At this time, the shape of the connection port 133 may be changed according to the order in which the mounting block 120 and the electronic control unit 30 are coupled to the hydraulic block 10, and the shape change of the connection port 133 is only a difference according to the assembly order, and its function is the same.

The cable 134 connects the sensing unit 132*a* and the connection port 133 to transmit signals on the change in magnetic field detected by the sensing unit 132*a* to the electronic control unit 30 through the connection port 133. In this case, the cable 134 may be provided with a predetermined length to maintain the connection between the sensing unit 132*a* and the connection port 133 even if a position of the sensor housing 132 changes. For example, the cable 134 may be provided to have a spare length so that the connection between the sensing unit 132*a* and the connection port 133 is maintained even when the sensor housing 132 moves to a maximum distance allowed in a direction away from the connection port 133.

As described above, changing the position of the sensor housing 132, that is, the sensing unit 132*a* through the cap bolt 135 is to adjust the position of the sensing unit 132 to smoothly perform the function of the detecting member 130, in the case of that the positions of the magnet 110 and the sensing unit 132*a* are not provided at the required positions when the hydraulic block 10 and the mounting block 120 are assembled. Accordingly, in the prior art, when installation positions of the sensor and the magnet are out of an allowable error range, the entire product should be exchanged and repaired, but in an exemplary embodiment of the disclosure, the position of the sensing unit 132*a* may be changed, thereby solving this problem.

According to one aspect of the disclosure, even if the mounting block 120 is assembled in a state in which the hydraulic block 10 and the electronic control unit 30 are coupled first or even if the electronic control unit 30 is assembled to the hydraulic block 10 in a state in which the mounting block 120 and the hydraulic block 10 are coupled first, the electronic control unit 30 and the detecting member 130 may electrically and mechanically connected. Therefore, it can be easily assembled through a product whose performance has been verified, thereby enabling outsourcing.

Then, a structure in which the mounting block 120 is assembled to the hydraulic block 10 to which the electronic control unit 30 is coupled (see FIGS. 9A and 9B) and a structure in which the electronic control unit 30 is assembled in a state in which the mounting block 120 is assembled to the hydraulic block 10 coupled (see FIGS. 10A and 10B) will be described.

FIGS. 9A and 9B are views showing a state in which the mounting block of the sensor module for the brake system according to an exemplary embodiment of the present disclosure is assembled to the hydraulic block to which the electronic control unit is coupled.

Referring to FIGS. 9A and 9B, in a state in which the electronic control unit 30 is assembled to the hydraulic block 10, the mounting block 120 provided with the detecting member 130 is assembled to the hydraulic block 10. At this time, since the detecting member 130 is disposed at a position corresponding to the connector 33 of the electronic control unit 30, the connection port 133 may be coupled with the connector 33 of the electronic control unit when the mounting block 120 is assembled to the hydraulic block 10. At this time, even if the positions of the sensing unit 132*a* of the magnet 110 and the detecting member 130 are not disposed at positions opposite to each other due to assembly tolerance, the positions of the magnet 110 and the sensing unit 132*a* may be adjustable to face each other by changing the position of the detecting member 130.

FIGS. 10A and 10B are views illustrating a state in which the electronic control unit is assembled to the hydraulic block in a state in which the mounting block of the sensor module for the brake system according to an exemplary embodiment of the present disclosure is assembled to the hydraulic block.

Referring to FIGS. 10A and 10B, the electronic control unit 30 is assembled to the hydraulic block 10 in a state where the mounting block 120 provided with the detecting member 130 is assembled to the hydraulic block 10. In this case, the connection port 133 of the detecting member 130 may be provided to face the connector 33 of the electronic control unit 30 through the mounting block 120. Accordingly, when the electronic control unit 30 is assembled to the hydraulic block 10, the connection port 133 may be coupled to the connector 33 of the electronic control unit 30. At this time, even if the positions of the magnet 110 and the sensing unit 132*a* of the detecting member 130 are not disposed at positions opposite to each other due to assembly tolerance, the positions of the magnet 110 and the sensing unit 132*a* may be adjustable to face each other by changing the position of the detecting member 130.

Then, an operation of detecting a displacement according to a movement change of the movable member by the sensor module 100 for the brake system as described above will be described.

Referring to FIG. 11, when a driver depresses the brake pedal (not shown) for braking, the push rod 12 connected to the brake pedal presses the first piston 21 by the operation of the brake pedal, so that the first piston 21 moves forward. At this time, the magnet 110 coupled to the first piston 21 moves together with the first piston 21. As a result, the detecting member 130, that is, the sensing unit 132*a* detects the movement displacement of the first piston 21 (brake pedal) as the change in magnetic force strength with the magnet 110 is detected.

When the displacement of the movable member is detected by the sensor module 100 as described above, the detected signal is output to the electronic control unit 30 to detect mechanical momentum of the brake pedal, that is, the movable member. Accordingly, the brake system is controlled through the detected measured value of the movable member.

As a result, the sensor module 100 according to an exemplary embodiment of the disclosure may secure ease of assembly by assembling the detecting member 130 to the mounting block 120. Furthermore, the disclosure is assembled and delivered in a state in which the verification of the detecting member 130 is completed, outsourcing is available and easy management is achieved.

As is apparent from the above, the sensor module for a brake system according to various embodiments of the present disclosure may simplify the structure and be easily assembled using a product whose performance has been verified, thereby enabling outsourcing.

Furthermore, the sensor module for a brake system according to various embodiments of the present disclosure may secure ease of assembly by allowing the assembly sequence to be installed in the brake system to be freely set.

Furthermore, the sensor module for a brake system according to various embodiments of the present disclosure may improve reliability of a product by adjusting the position of the sensing unit even if an installation error occurs between the movable member and the sensing unit to measure the displacement.

As described above, the exemplary embodiments of the disclosure have thus far been described with reference to accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A sensor module for a brake system that measures a moving distance of a movable member interlocking according to a pedal effort of a brake pedal, the sensor module comprising:

a magnet provided on the movable member;

a mounting block provided so that the movable member moves forward and backward, the mounting block coupled to a hydraulic block in which a master cylinder is formed to be fixed to a dashboard of a vehicle; and a detecting member provided on the mounting block in order to be spaced apart from the magnet at a predetermined interval, and configured to detect a change in magnetic field according to a movement of the movable member, wherein:

the mounting block and the hydraulic block are formed as separate components and are assembled to each other, the detecting member has a predetermined length, and is disposed in the sensor mounting hole formed in the mounting block to have a direction parallel to a moving direction of the movable member, the detecting member is provided to be variable in a position thereof in the longitudinal direction of the sensor mounting hole, and the detecting member comprises:

a sensor housing provided slidably in the sensor mounting hole and provided with a sensing unit for detecting a change in magnetic field, a connection port coupled to the electronic control unit, a cap bolt coupled to move together with the sensor housing and screw-coupled into the sensor mounting hole, and a cable connecting the sensing unit and the connection port.

2. The sensor module of claim 1, wherein the detecting member is provided integrally with the mounting block, or provided to be detachably assembled.

3. The sensor module of claim 1, wherein the detecting member is electrically and mechanically connected to an electronic control unit (ECU) mounted on the hydraulic block through the mounting block.

4. The sensor module of claim 3, wherein the electronic control unit and the detecting member are electrically and mechanically connected even if the mounting block is assembled to the hydraulic block in a state in which the electronic control unit is coupled to the hydraulic block, or even if the electronic control unit is assembled to the hydraulic block after assembling the mounting block to the hydraulic block.

5. The sensor module of claim 1, wherein the detecting member further comprises:

a main housing configured to accommodate slidably the sensor housing, be inserted and coupled to the sensor mounting hole, and be hollow so that opposite sides thereof are opened in the longitudinal direction.

6. The sensor module of claim 5, wherein the cap bolt coupled to the sensor housing is provided on one open side of the main housing, and the connection port is coupled to the other open side of the main housing.

7. The sensor module of claim 5, wherein a guide groove is formed in the main housing in a moving direction of the sensor housing, and a guide protrusion is provided in the sensor housing to be inserted into the guide groove and guided when moving.

8. The sensor module of claim 1, wherein the cable has a predetermined length to maintain a connection between the sensing unit and the connection port even if a position of the sensor housing changes.

9. The sensor module of claim 5, wherein the cap bolt further comprises:

a head part screw-coupled to the sensor mounting hole, and a coupling part extending from the head part and coupled to the sensor housing.

10. The sensor module of claim 9, wherein the sensor housing is provided with a coupling groove coupled to the coupling part, the coupling groove is provided with an anti-separation step formed to have a diameter smaller than that of the coupling groove, and an anti-separation protrusion corresponding to the diameter of the coupling groove is provided on the coupling part to prevent the coupling part from being separated from the coupling groove.

11. The sensor module of claim 9, wherein the sensor mounting hole is divided into a first mounting hole to which the main housing is coupled and a second mounting hole to which the cap bolt is coupled, and the second mounting hole has a length longer than that of the head part of the cap bolt.

12. The sensor module of claim 1, wherein the movable member is provided with a push rod connected to the brake pedal, and a piston pressed by the push rod, the magnet is provided on the push rod or the piston.

13. The sensor module of claim 1, wherein the movable member is provided as a piston that moves forward and backward in a bore formed in the hydraulic block, and further comprises a clip made of a steel material and fixed to an outer circumferential surface of the piston, and the magnet is attached to the clip by a magnetic force to be fixed to the piston.

14. The sensor module of claim 13, wherein a stepped portion is provided on the outer circumferential surface of the piston, and the clip and the magnet are provided on the stepped portion so as not to protrude from an outer diameter of the piston.

15. The sensor module of claim 13, wherein a portion of the piston is provided to protrude from the hydraulic block, the mounting block further comprises:

a guide portion coupled to the hydraulic block to surround the piston protruding from the hydraulic block, and a mounting portion extending in a radial direction from one side of an outer circumferential surface of the guide portion and fixed to the dashboard of the vehicle, wherein the guide portion has a through hole into which a push rod for pressing the piston is inserted.

16. The sensor module of claim 1, wherein at least a portion of the piston is accommodated in the mounting block.

* * * * *